United States Patent
Kurtzberg et al.

(10) Patent No.: US 6,336,127 B1
(45) Date of Patent: Jan. 1, 2002

(54) DYNAMIC USER MANAGEMENT FOR TIMED SHARED COMPUTER SYSTEMS

(75) Inventors: Jerome M. Kurtzberg; Menachem Levanoni, both of Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/007,684

(22) Filed: Jan. 15, 1998

(51) Int. Cl.[7] .................................................. G06F 9/00
(52) U.S. Cl. ..................................... 709/104; 709/105
(58) Field of Search ................................ 709/100–108; 711/113, 114

(56) References Cited

U.S. PATENT DOCUMENTS

| | | | | |
|---|---|---|---|---|
| 4,914,570 A | * | 4/1990 | Peacock | 709/106 |
| 5,603,029 A | * | 2/1997 | Aman et al. | 709/105 |
| 5,668,995 A | * | 9/1997 | Bhat | 709/104 |
| 5,694,602 A | * | 12/1997 | Smith | 709/105 |
| 5,784,616 A | * | 7/1998 | Horvitz | 709/102 |
| 5,790,862 A | * | 8/1998 | Tanaka et al. | 395/705 |
| 5,845,318 A | * | 12/1998 | Rose et al. | 711/113 |
| 5,889,989 A | * | 3/1999 | Robertazzi et al. | 709/105 |

FOREIGN PATENT DOCUMENTS

KR 96-66427 * 9/1998

OTHER PUBLICATIONS

Jerome Kurtzberg, "On approximation methods for the assignment problem" ACM 9(4) 419–439. Oct. 1962.*
Sinnwell et al, "a cost–model–based online method for distributed caching", IEEE, Apr. 1997.*
Emile Haddad, Dynamic optimization of load distribution in heterogeneous systems' IEEE digital library 1994.*
Deckro et al; "Cost based allocation of resources in project planning", IEEE digital library, pp. 278–283, 1991.*

* cited by examiner

*Primary Examiner*—Majid A. Banankhah
(74) *Attorney, Agent, or Firm*—Stephen C. Kaufman; McGinn & Gibb, PLLC

(57) ABSTRACT

In a time shared computer system, each user gets pro-rated computer resources over some interval of time. These resources are various classes of memory and disk storage and, in multi-processor systems, a share of one or more processors. These resources are limited and not all users can be active or even contained in memory at any given time. The problem addressed in this invention is how to allocate the computer resources at any given time for the set of users.

17 Claims, 4 Drawing Sheets

DYNAMIC USER MANAGEMENT FOR TIMED SHARED COMPUTER SYSTEMS

BACKGROUND OF THE INVENTION

This invention relates to dynamic user management for time shared computer systems.

INTRODUCTION TO THE INVENTION

In a time shared computer system, each user can get pro-rated computer resources over some interval of time. These resources are various classes of memory and disk storage and, in multi-processor systems, a share of one or more processors. These resources are limited, however, and not all users can be active or even contained in memory at any given time. The problem addressed in this invention is how to allocate the computer resources at any given time for the set of users.

SUMMARY OF THE INVENTION

We note that currently, each user has a priority and is given a fixed slice of computer time in which he can do his processing, and then has an inactive period of time during which other users are active. The frequency of user activation is determined by the given user's priority. There is no optimal discipline for replacement of one or more users in memory by a newly activated user.

We have now discovered a novel method for allocating computer resources specifically, dealing in particular with the task of determining which set of users are to be contained in memory at any given time in order to maximize the performance of the time-shared computer system.

The novel method is suitable for determining a set of users which are to be contained in a main memory at a given time, the method comprising the steps of:

(i) tracing for each active user a usage of computer resources;

(ii) evaluating for each inactive user an expected usage of computer resources;

(iii) identifying a set of users to be resident in main memory at a given time; and (iv) employing a user measure based upon the usage of computer resources based upon input from steps (i)–(iii), for determining a dynamic user replacement plan for maintaining a set of users in main memory at a given time.

BRIEF DESCRIPTION OF THE DRAWINGS

The invention is illustrated in the accompanying drawing, in which.

DETAILED DESCRIPTION OF THE INVENTION

With reference to the novel method as summarized above, we now disclose preferred particular method steps.

The user measure may comprise selecting a dynamic user based upon a history of frequency of usage of computer resources. Alternatively, the user measure may comprise selecting a dynamic user based upon a value of retaining a user in memory.

For this alternative, moreover, a value is preferably based upon a cost of removing and returning a user to main memory, and preferably comprises a further step of weighing the cost of removing and returning a user to main memory. Finally, a user measure may comprise a step of selecting a dynamic user based upon a history of frequency of usage computer resources and selecting a dynamic user based upon a value of retaining a user in memory.

Figure 1:
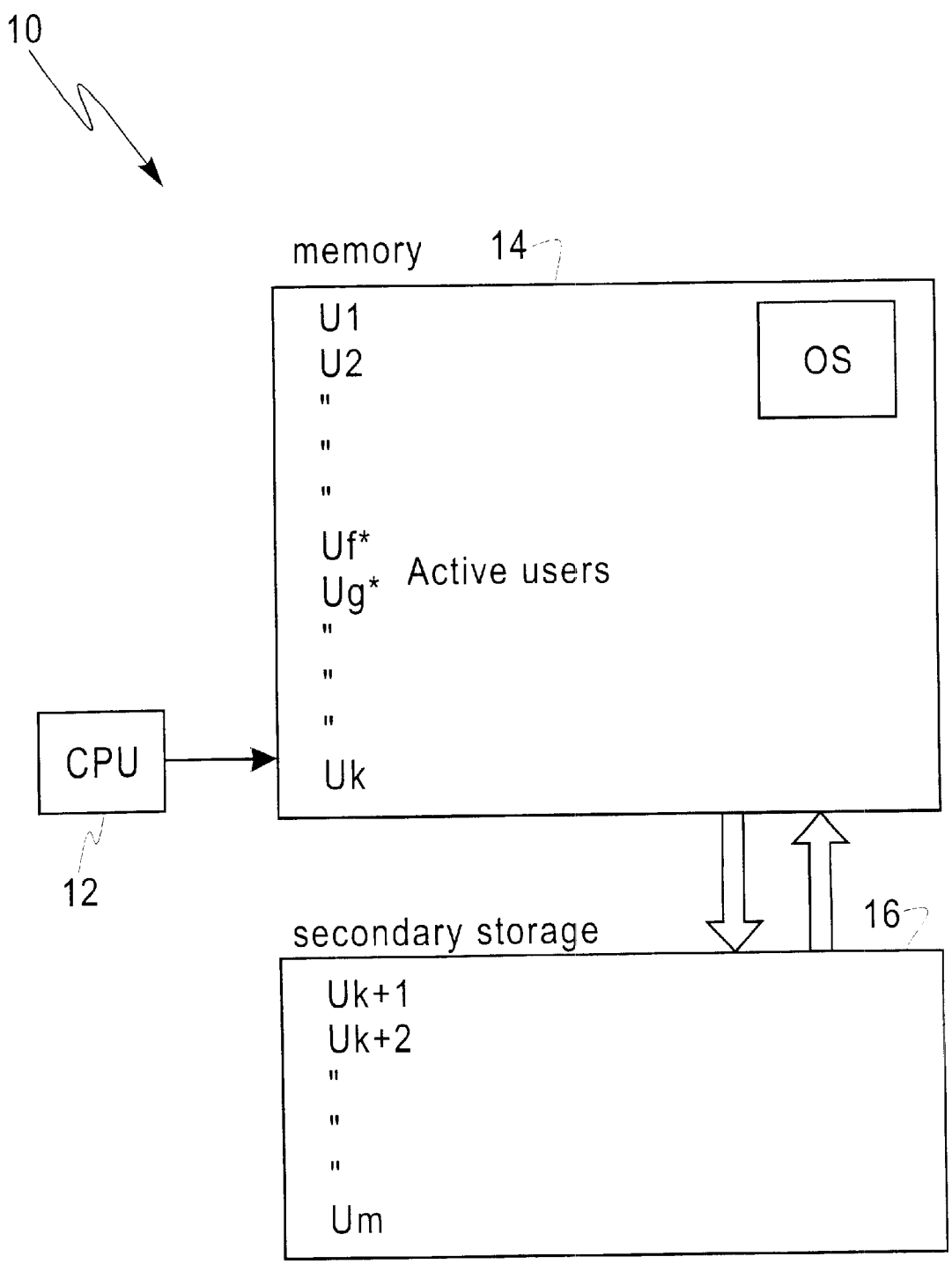
FIG. 1 shows a time shared system which can reference applicability of the method of the present invention.
Figure 2:
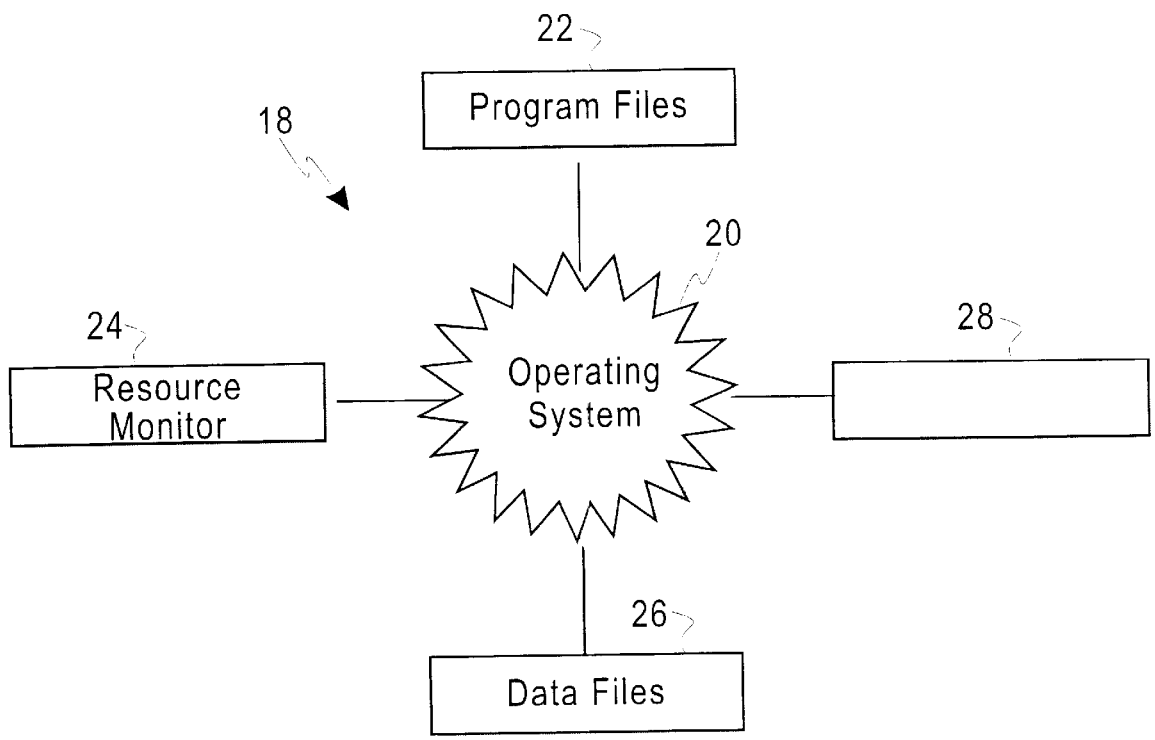
FIG. 2 shows a device embedded in an operating system which can monitor resource usage history.
Figure 3:
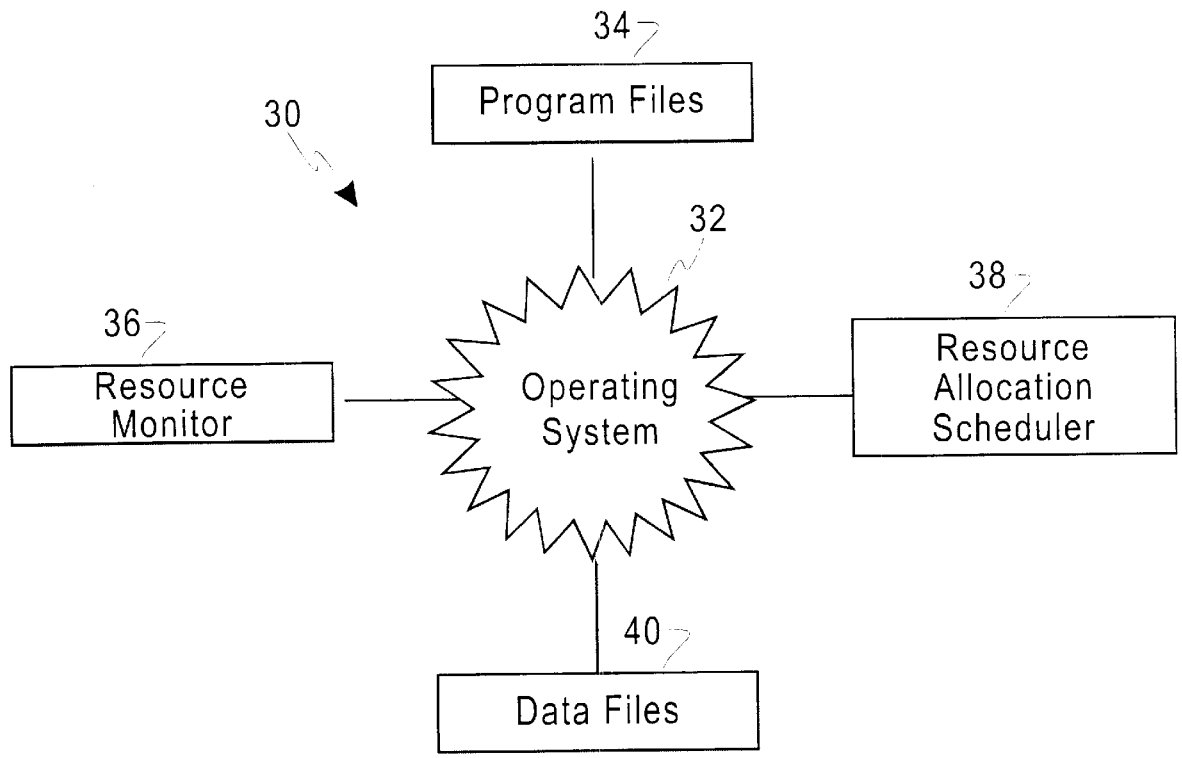
FIG. 3 shows a resource allocation scheduler also embedded.
Figure 4:
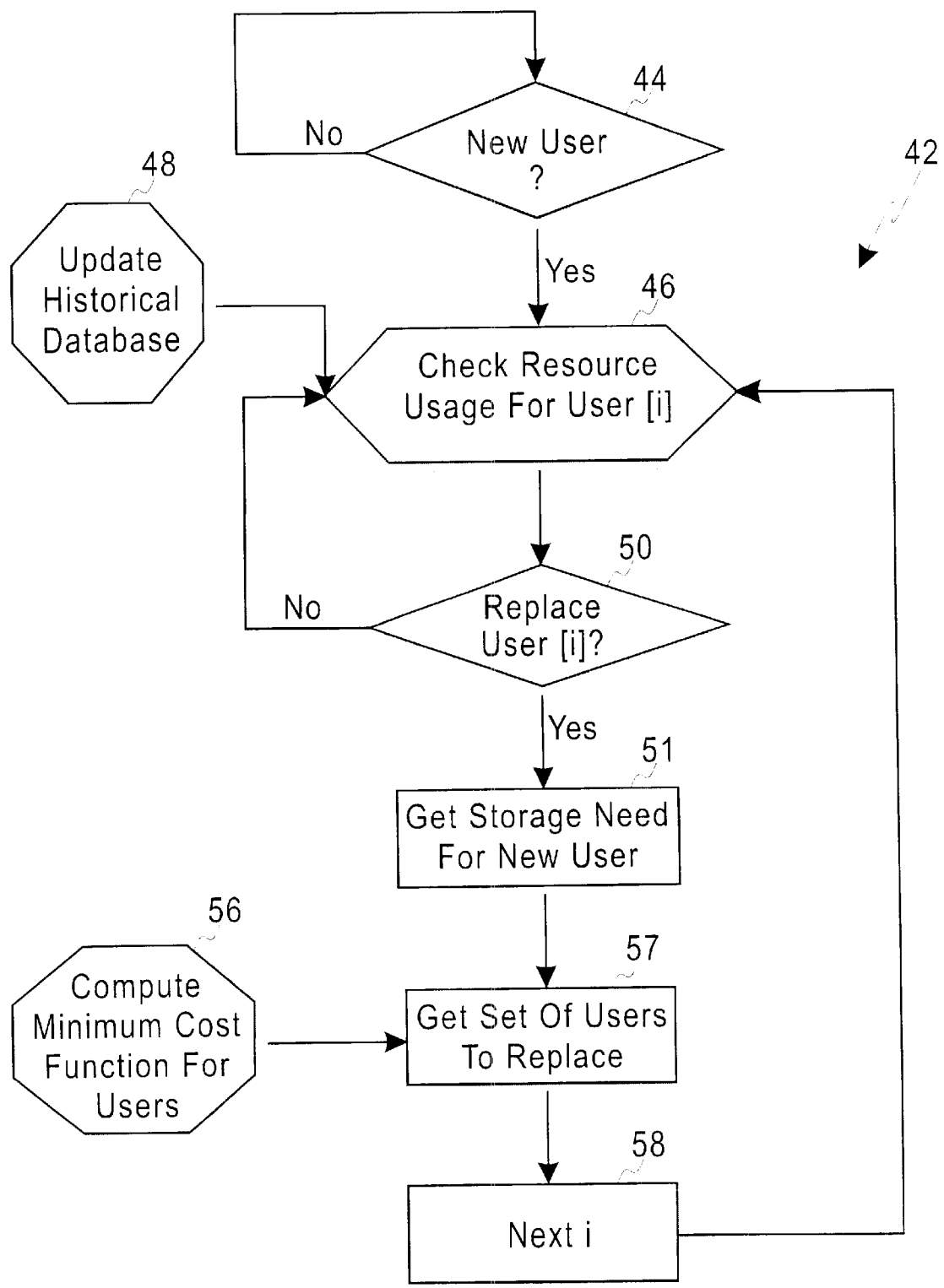
FIG. 4 shows a flow chart of the operational flow.

Attention is now directed to FIGS. 1–4 (numerals 10–58, respectively) for further illustration of realization of the present invention.

In particular, consider a given inactive user who requires k1 units of main memory, k2 units of secondary storage, k3 units of CPU computation units and k4 network transmission units. The time required to restore this user's usage to main memory is L1. The time required to reconnect this user to secondary memory is L2. The time required for protocols to reestablish all required CPU usage connections is L3. The time required for reestablishing network protocols is L4.

The priority class for this user is Priority 2 with an importance weight W2 (Each user is assigned to a priority class with weights signifying the importance of the priority class).

The cost of removing this user from main memory is therefore:

$$W2*(K1*L1+K2*L2+K3*L3+K4*L4)$$

Similar costs are derived for all inactive users.

Memory requirements for a user to be resident in main memory are noted and a sufficient number of users necessary to meet the memory requirements are determined.

The user (or set of users) that meet the memory requirements with the lowest replacement cost is replaced.

What is claimed is:

1. A method for determining an optimal set of users which are to be contained in a main memory at a given time, the method comprising:

(i) tracing for each active user a usage of computer resources;

(ii) evaluating for each inactive user an expected usage of computer resources;

(iii) determining a replacement cost to delete and then subsequently re-instate into said main memory for each said active user and for each said inactive user;

(iv) identifying a set of users to be resident in main memory at a given time; and (v) employing a user measure based upon the usage of computer resources based upon input from steps (i)–(iv), for determining a dynamic user replacement plan for maintaining an optimal set of users main memory at a given time, thereby allocating computer resources at any given time for the optimal set of users, such that system usage is optimized, whereby a user with a lowest replacement cost is replaced as necessary to maintain an optimal set of users.

2. A method according to claim 1, wherein the user measure comprises selecting a dynamic set of users based upon a history of frequency of usage of computer resources.

3. A method according to claim 1, wherein the user measure comprises selecting a dynamic set of users based upon a value of retaining a user in said main memory.

4. A method according to claim 1, wherein the user measure comprises selecting a set of dynamic users based upon a history of frequency of usage of computer resources and selecting a set of dynamic users based upon a value of retaining a user in said main memory.

5. A method according to claim 3, wherein the value is based upon a cost of removing and returning a user to said main memory.

6. A method according to claim 5, further comprising the step of weighing the cost of removing and returning a user to said main memory.

7. The method according to claim 1, wherein said lowest replacement cost is determined by determining for each inactive user a number k1 of units of main memory, a number k2 of units of secondary storage required, a number k3 of units of central processing unit (CPU) computation, and a number k4 of units of network transmission.

8. The method according to claim 7, wherein said lowest replacement cost is further determined by determining the time L1 to restore said each user of said set of users to main memory, a time L2 of reconnected said user to secondary memory, a time L3 required for protocols to reestablish all required CPU usage connections, an a time L4 for required for reestablishing network protocols.

9. The method according to claim 8, wherein said lowest replacement cost is further determined by providing each user of said set of users a priority class with an importance weight W2.

10. The method according to claim 9, wherein said lowest replacement cost is further determined by W2*(K1*L1+K2*L2+K3*L3+K4*L4).

11. The method according to claim 1, wherein memory requirements for a user to be resident in main memory are noted and a sufficient number of users necessary to meet the memory requirements are determined.

12. A method for dynamically determining a set of users which are to be contained in a main memory at a given time, the method comprising:

(i) tracing for each active user a usage of computer resources;

(ii) evaluating for each inactive user an expected usage of computer resources;

(iii) determining a replacement cost to delete and then subsequently re-instate into said main memory for each said active user and for each said inactive user;

(iv) identifying a set of users to be resident in main memory at a given time; and (v) employing a user measure based upon the usage of computer resources based upon input from steps (i)–(iv), for determining a dynamic user replacement plan for maintaining an optimal set of users in main memory at a given time, thereby allocating computer resources at any given time for the optimal set of users, such that system usage is optimized, wherein the user measure comprises selecting a dynamic user based upon a history of frequency of usage of computer resources, and wherein users with a lowest replacement cost are replaced.

13. The method according to claim 12, wherein said lowest replacement cost is determined by determining for each inactive user a number k1 of units of main memory, a number k2 of units of secondary storage required, a number k3 of units of central processing unit (CPU) computation, and a number k4 of units of network transmission.

14. The method according to claim 13, wherein said lowest replacement cost is further determined by determining the time L1 to restore said each user of said set of users to main memory, a time L2 of reconnected said user to secondary memory, a time L3 required for protocols to reestablish all required CPU usage connections, an a time L4 for required for reestablishing network protocols.

15. A method for dynamically determining an optimal set of users which are to be contained in a main memory at a given time, the method comprising:

(i) tracing for each active user a usage of computer resources;

(ii) evaluating for each inactive user an expected usage of computer resources;

(iii) determining a replacement cost to delete and then subsequently re-instate into said main memory for each said active user and for each said inactive user;

(iv) identifying a set of users to be resident in main memory at a given time; and (iv) employing a user measure based upon the usage of computer resources based upon input from steps (i)–(iii), for determining a dynamic user replacement plan for maintaining an optimal set of users in main memory at a given time, thereby allocating computer resources at any given time for the optimal set of users, such that system usage is optimized, wherein the user measure comprises selecting a dynamic user based upon a value of retaining a user in said main memory, and wherein users with the lowest replacement cost are replaced.

16. The method according to claim 15, wherein said lowest replacement cost is determined by determining for each inactive user a number k1 of units of main memory, a number k2 of units of secondary storage required, a number k3 of units of central processing unit (CPU) computation, and a number k4 of units of network transmission.

17. The method according to claim 16, wherein said lowest replacement cost is further determined by determining the time L1 to restore said each user of said set of users to main memory, a time L2 of reconnected said user to secondary memory, a time L3 required for protocols to reestablish all required CPU usage connections, an a time L4 for required for reestablishing network protocols.

* * * * *